(12) United States Patent
Aumüller et al.

(10) Patent No.: US 7,431,406 B2
(45) Date of Patent: Oct. 7, 2008

(54) COMPRESSED AIR PROCESSING SYSTEM

(75) Inventors: Ralf Aumüller, Frankfurt am Main (DE); Siegfried Heer, Wiesloch (DE); Joachim Nöcker, Eberbach (DE)

(73) Assignee: Haldex Brake Products GmbH (DE)

( * ) Notice: Subject to any disclaimer, the term of this patent is extended or adjusted under 35 U.S.C. 154(b) by 446 days.

(21) Appl. No.: 10/816,448

(22) Filed: Apr. 1, 2004

(65) Prior Publication Data
US 2004/0195910 A1    Oct. 7, 2004

(30) Foreign Application Priority Data
Apr. 1, 2003    (DE) ................. 103 14 642

(51) Int. Cl.
*B60T 13/70*    (2006.01)

(52) U.S. Cl. ............... 303/15; 303/71; 303/3; 303/6.01

(58) Field of Classification Search ............. 303/15–18, 303/3, 1, 28, DIG. 3, 90, 71, 7–8, 6.01, 86, 303/9.76, 68, 69; 188/170; 137/118.06, 137/115.19, 115.23
See application file for complete search history.

(56) References Cited

U.S. PATENT DOCUMENTS

| | | | | |
|---|---|---|---|---|
| 6,041,808 A | 3/2000 | Blanz | ..................... | 137/118.06 |
| 6,089,831 A | 7/2000 | Bruehmann et al. | ......... | 417/282 |
| 6,540,308 B1 * | 4/2003 | Hilberer | .................... | 303/6.01 |

FOREIGN PATENT DOCUMENTS

| | | |
|---|---|---|
| DE | 35 06 419 C1 | 6/1986 |
| DE | 195 44 621 | 1/1997 |
| DE | 196 38 226 C1 | 2/1998 |
| DE | 019638226 C1 * | 2/1998 |
| DE | 100 38 266 A1 | 2/2002 |
| EP | 0 372 818 A2 | 6/1990 |
| EP | 0 689 117 A2 | 12/1995 |
| EP | 0 816 142 | 1/1998 |
| EP | 0 831 383 | 3/1998 |
| EP | 1 004 495 A2 | 5/2000 |
| EP | 0 776 807 B1 | 5/2001 |
| WO | WO 92/11151 | 7/1992 |
| WO | WO 03/008250 | 1/2003 |

OTHER PUBLICATIONS

International Search Report dated May 21, 2003.
European Search Report dated Jun. 11, 2004.

* cited by examiner

*Primary Examiner*—Robert A. Siconolfi
*Assistant Examiner*—Mariano Sy
(74) *Attorney, Agent, or Firm*—St. Onge Steward Johnston & Reens LLC

(57) ABSTRACT

The present invention relates to a compressed air processing system. The compressed air processing system includes an inlet connection, a pressure control unit, a multi-circuit protection valve, a plurality of outlet connections, a parking brake connection, an electronic control unit and a valve arrangement. The inlet connection is connected to a conduit coming from a compressor. Each of the outlet connections is connected to a circuit (I, II, and so forth). The parking brake connection is connected to a conduit coming from a parking brake cylinder. The electronic control unit includes an electric input connection for a control signal. The valve arrangement aerates and locks the parking brake connection in a controlled way due to a signal being generated by the electronic control unit. The valve arrangement also deaerates the parking brake connection due to a signal being generated by the electronic control unit.

20 Claims, 7 Drawing Sheets

COMPRESSED AIR PROCESSING SYSTEM

CROSS REFERENCE TO RELATED APPLICATIONS

This application claims priority to co-pending German Patent Application No. 103 14 642.3 entitled "Druckluftaufbereitungsgerät", filed Apr. 1, 2003.

FIELD OF THE INVENTION

The present invention generally relates to a compressed air processing system including an inlet connection, a pressure control unit, a multi-circuit protection valve, a plurality of outlet connections, a parking brake connection, an electronic control unit and a valve arrangement. Such compressed air processing systems usually are arranged downstream of a compressor, and they include a plurality of elements and valves. The compressed air processing system does not only include a pressure control unit, but also an integrated multi-circuit protection valve. In addition, it may include an air dryer.

BACKGROUND OF THE INVENTION

A compressed air processing system is known from German Patent No. DE 196 38 226 C1 corresponding to European Patent No. EP 0 831 383 B1. The housing of the known compressed air processing system includes an inlet connection to which a conduit coming from a processor is connected. A pressure control unit is arranged in the housing of the compressed air processing system. The pressure control unit includes a deaerating conduit leading to the atmosphere such that it switches between a load phase and an idle phase. In the load phase, compressed air flows into a central aerating system via an air dryer and a check valve. A central aerating system is to be understood as room or a space with which the respective conduits leading to the circuits of the system are connected. Each circuit includes an overflow valve being part of a multi-circuit protection valve. The overflow valve may also be generally designed as a pressure protection valve. The pressure protection valve may be designed as an electrically controllable solenoid valve. The system further includes a common electronic control unit serving to process signals and to control the pressure protection valves and additional valves such as valves being used during regeneration of the air dryer, for example. The known compressed air processing system also includes a parking brake connection, meaning a connection being connected to a conduit leading to a parking brake cylinder. This conduit branches off downstream of the pressure protection valve of a circuit, and it leads to the spring brake cylinders via a common hand brake valve. This conduit does not include a reservoir container since the amount of air required for release of the spring brake cylinder is comparatively small. The pressure control valve of this circuit from which the conduit leading to the parking brake connection branches off has a different design compared to the other pressure control valves. It includes a pneumatically controllable valve arrangement for aerating or locking the parking brake connection in a controlled way. The regeneration valve is also used to control the valve arrangement at the pressure control valve of this circuit. The valve arrangement may have two different positions, namely either the aerating position in which the conduit leading to the parking brake connection is aerated. The other position is the locking position in which this conduit is locked. The valve arrangement is controlled by the regeneration valve. The regeneration valve receives a control signal by the electronic control unit. Supply of the spring brake with compressed air is interrupted in the locking position such that it is possible to actuate the hand brake valve with its own deaerating system to actuate the parking brake. However, it is no longer possible to release the parking brake afterwards. This safety function may be of value in certain situations.

German Patent No. DE 196 38 226 C1 corresponding to European Patent No. EP 0 831 383 B1 discloses a second embodiment illustrated in FIG. 2 thereof. In this embodiment, the locking valve for the supply conduit leading to the compressed spring of the parking brake is not integrated in the compressed air processing system, but instead arranged outside of the system upstream of the hand brake valve. The electronic control unit of the known compressed air processing system includes an electric output connection transmitting a signal which may be transmitted to the electrically controllable locking valve. The locking valve then takes its locking position, while the passage position (or aerating position) is supplied by a mechanical spring. The known hand brake valve used in all modern brake systems which serves to aerate and deaerate the spring brake cylinder indirectly or directly requires a majority of conduits and conduit connections. Since the hand brake valve always has to be located in the driver's cabin of the motor vehicle, the respective conduits have to be installed in the driver's cabin which is comparatively complicated.

A compressed air processing system including an inlet connection being connected to a conduit coming from a compressor is known from German Patent Application No. DE 198 35 638 A1 corresponding to U.S. Pat. No. 6,540,308. The known compressed air processing system includes a pressure control unit, a multi-circuit protection valve and a plurality of outlet connections leading to the respective circuits. It also includes a parking brake connection connected to a conduit leading to a parking brake cylinder. The system also includes an electronic control unit. The compressed air processing system does not include a valve arrangement serving to aerate or lock the parking brake connection in a controlled way. A check valve may be integrated at the compressed air processing system to protect the parking brake system when a conduit in circuit III breaks. In the circuit III, meaning outside of the compressed air processing system, there may be a deaerating valve for the parking brake system.

SUMMARY OF THE INVENTION

The present invention relates to a compressed air processing system. The compressed air processing system includes an inlet connection, a pressure control unit, a multi-circuit protection valve, a plurality of outlet connections, a parking brake connection, an electronic control unit and a valve arrangement. The inlet connection is designed and arranged to be connected to a conduit being connected to a compressor. Each of the outlet connections is designed and arranged to be connected to a circuit. The parking brake connection is designed and arranged to be connected to a conduit being connected to a parking brake cylinder. The electronic control unit includes an electric input connection for a control signal. The valve arrangement is designed and arranged to aerate and lock the parking brake connection in a controlled way due to a signal being generated by the electronic control unit. The valve arrangement is designed and arranged to deaerate the parking brake connection due to a signal being generated by the electronic control unit.

The novel compressed air processing system is less complicated and less expensive compared to prior art systems, and it includes a reduced number of conduits and connections. The novel compressed air processing system includes an integrated valve arrangement being associated with the parking brake of the motor vehicle. The valve arrangement does not only serve to aerate (or lock) the parking brake connection in a controlled way in response to a signal generated by the electronic control unit. The valve arrangement also has a deaerating (venting) function for the parking brake connection and the conduit being connected thereto. In the novel system, the hand brake valve or at least substantial parts thereof are integrated. This also applies to the deaerating function being integrated in the compressed air processing system. It is part of the novel concept of the present invention not to use a hand brake valve. Such a hand brake valve has always been used and considered necessary in the prior art. Due to the fact that it has to be possible to actuate the auxiliary brake and/or the parking brake from the driver's cabin of the vehicle, a hand brake valve (formerly arranged in the driver's cabin) is no longer required, and it may be replaced by a simple electric switch, for example. With this switch, the driver may transmit a control signal when the driver desires to actuate the parking brake. The control signal is transmitted to the electronic control unit in the compressed air processing system via an electric input connection, and it is processed by the electronic control unit. A control signal is generated, the control signal directly or indirectly switching and controlling, respectively, the valve arrangement. Additional control signals may be transmitted via the input connection at the electronic control unit or via additional connections. These additional signals have an effect on the auxiliary brake and/or the parking brake. For example, the control signals may be transmitted via a CAN bus. In this way, it is possible to use the auxiliary brake and/or the parking brake to simplify start of the vehicle when been stopped on a hill. Since the novel system does not include a manually operable hand brake valve, respective conduit connections, screw connections and other connections are not required.

The valve arrangement may include two separately controllable switching valves of which the first switching valve has a passage position and a locking position, while the second switching valve has a locking position and a deaerating position. In this way, in addition to the usual functions of a parking brake, the functionality of a stepped auxiliary brake is obtained. The pressure prevailing in the conduit leading to the parking brake cylinders may be infinitely adjusted due to respective control. This is possible when the conduit being connected to the parking brake connection is a direct conduit. In the other case, when using relay control, this conduit may also be designated as a control conduit. Another possibility is to design the valve arrangement such that it includes a 3/2 ways valve having its own deaerating system.

In combination with the different possible ways of designing the valve arrangement, it makes sense to arrange a pressure sensor between the valve arrangement and the parking brake connection. The signals of the pressure sensor are transmitted to the electronic control unit. This especially applies when realizing the stepped auxiliary brake.

The conduit leading to the parking brake connection via the valve arrangement may be arranged to branch off from a different circuit after its overflow valve or pressure protection valve. However, it is also possible that the conduit including the valve arrangement and leading to the parking brake connection is connected to a central aerating system for all circuits. The overflow valves or pressure protection valves of another circuit are bypassed. It is to be understood that this connection is arranged upstream of the check valve at which the central aerating system begins. In this way, there is the advantage of not having to use an overflow valve or a pressure control valve at this place since the valve arrangement fulfills a safety function. The valve realizing the aerating function and the locking function may be moved into the locking position by a mechanical spring. In this way, the locking position is attained during power failure or desired interruption of power supply, especially when turning off the ignition. As a result, the parking brake keeps the position it had before the power interruption occurred.

There are a number of possibilities of designing the valve or the valves of the valve arrangement. It is possible to use switching valves being pre-controlled by solenoid valves, meaning pneumatically controllable valves being pre-controlled by solenoid valves. In this way, the electric signals of the electronic control unit are transmitted to the solenoid valves. The solenoid valves then switch the pneumatically designed valves. However, it is also possible to use directly controllable solenoid valves, meaning pneumatically designed switching valves which are magnetically controlled such that the signals of the electronic control unit have a direct effect. These possibilities may be used when the valve arrangement includes two valves and also when the valve arrangement only includes one valve being designed as a 3/2 ways valve. The two separately controllable valves are arranged in series in the conduit leading to the parking brake connection.

All these valves of the valve arrangement include at least two positions. In case the deaerating position of the parking brake connection is realized by a mechanical spring, there is the safety feature of the parking brake being actuated during power failure.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION OF DRAWINGS

Figure 1:
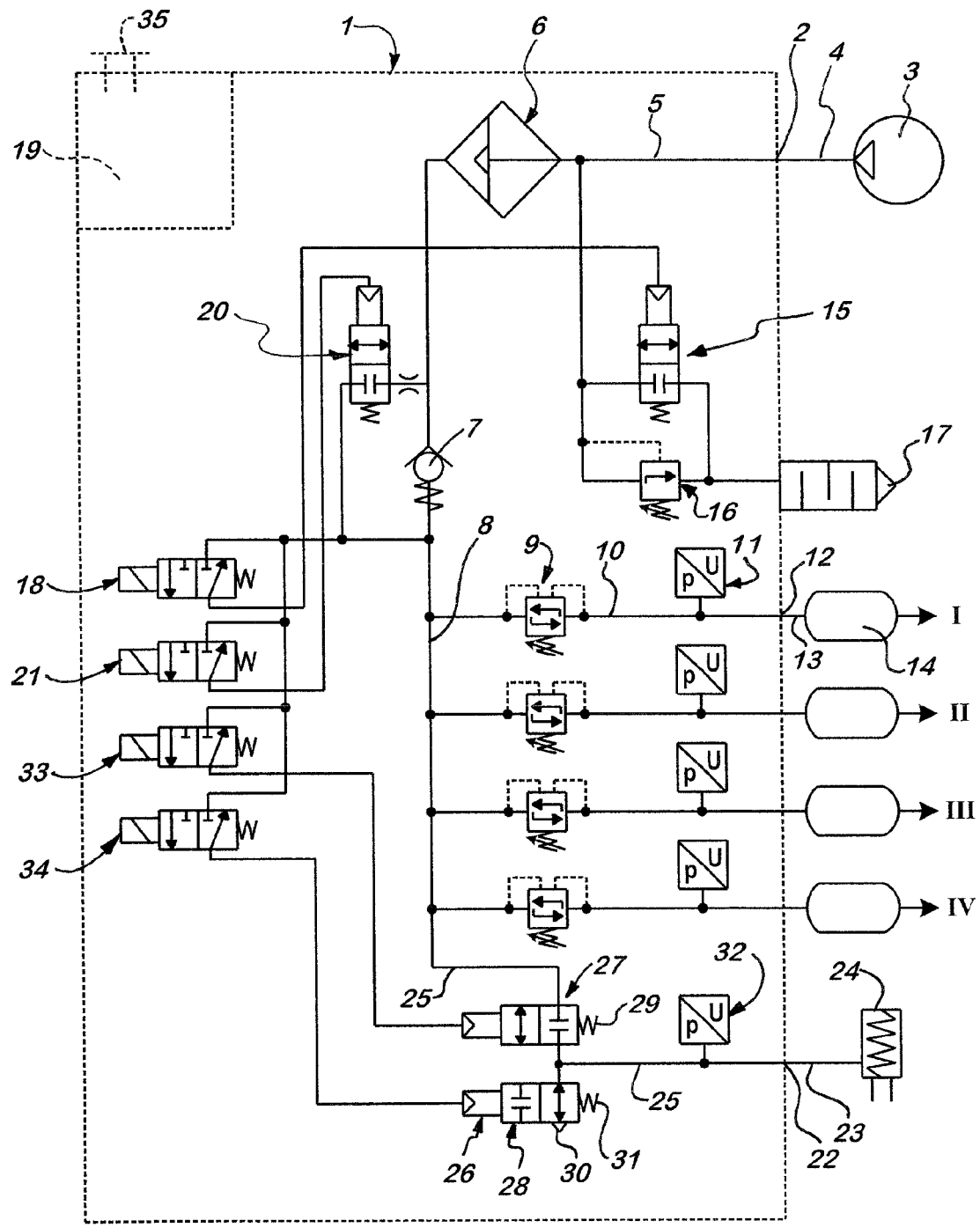
FIG. 1 is a view of a schematic connection diagram of a first exemplary embodiment of the novel compressed air processing system.

Referring now in greater detail to the drawings, FIG. 1 illustrates the novel compressed air processing system including a housing 1. An inlet connection 2 is located at the housing 1. A conduit 4 coming from a processor 3 is connected to the inlet connection 2. A pneumatic conduit 5 begins at the inlet conduit 2, the pneumatic conduit 5 leading to a check valve 7 via an air dryer 6. The conduit 5 is connected to a central aerating system 8. In this case, the aerating system 8 is designed as a central bore being located in the housing 1. All circuits of the compressed air system are supplied with compressed air via the central aerating system 8 in a known way. A pressure protection valve 9 is located in each circuit. The pressure protection valve 9 may be designed as an overflow valve having limited backflow. A conduit 10 being associated with the circuit I leads from the central aerating system 8 to an outlet connection 12 being located at the housing 1 via the pressure protection valve 9 and a pressure sensor 11. The outlet connection 12 serves for connection of a conduit 13 leading to a reservoir container 14 of the circuit I. The circuits II, III and IV have the same structure, and they are connected to the central aerating system 8 in the same way as this has been described hereinabove with respect to the circuit I.

A pressure control unit 15 is also arranged in the compressed air processing system. The pressure control unit 15 includes a pneumatically controllable valve having a passage position and a locking position. A safety valve 16 is arranged parallel to this valve. Both valves lead to a deaerating opening 17 being located at the housing 1 in a known way. The valve of the pressure control unit 15 is pre-controlled by a solenoid valve 18. The solenoid valve 18 also receives compressed air from the central aerating system 8, and it includes an electric line (not illustrated) leading to an electronic control unit 19. The electronic control unit 19 is also located in the housing 1 of the compressed air processing system. It is to be understood that respective electric lines are arranged between all the pressure sensors 11 and the electronic control unit 19 to interconnect these elements.

In the exemplary embodiment of the compressed air processing system illustrated in FIG. 1, the compressed air processing system also includes a regeneration valve 20 which is pre-controlled by a solenoid valve 21. The solenoid valve 21 is also controlled by control signals being transmitted by the electronic control unit 19.

A parking brake connection 22 is arranged at the housing 1. The parking brake connection 22 serves for connection of a conduit 23 being designed as a directly controllable conduit leading to the parking brake cylinders 24. A conduit 25 is connected to the central aerating system 8. The conduit 25 ends at the parking brake connection 22. A valve arrangement 26 is located in the conduit 25. The valve arrangement 26 includes a first pneumatically controllable switching valve 27 and a second pneumatically controllable switching valve 28. Each of the two switching valves 27 and 28 has two positions. The first switching valve 27 has a passage position (or aerating position) and a locking position. A spring 29 is associated with the switching valve 27 in a way that the switching valve 27 in its non-controlled position is located in the locking position. The second switching valve 28 is located in the conduit 25, and it includes its own deaerating system 30 via which the parking brake connection 22 is deaerated. Due to deaeration of the spring brake cylinder 24 resulting therefrom, the auxiliary brake and/or the parking brake is actuated. The second switching valve 28 also has two positions, namely a locking position and a passage position and deaerating position, respectively. A spring 31 acts upon the deaerating position in which there is no pneumatic control signal at the switching valve 28. A pressure sensor 32 is located in the part of the conduit 25 which leads from the valve arrangement 26 to the parking brake connection 22. A potential signal created by the pressure sensor 32 is transmitted to the electronic control unit 19.

Solenoid valves 33 and 34 serve for pneumatic pre-control of the two switching valves 27 and 28. These solenoid valves 33 and 34 are connected with the electronic control unit 19 by electric lines (not illustrated), and they are respectively controlled thereby. Compressed air supply of the solenoid valves 33 and 34 is realized by the central aerating system 8, as this is illustrated in FIG. 1. The solenoid valves 33 and 34 include an own deaerating system, as well as the solenoid valves 18 and 21. All solenoid valves are designed and arranged in a way as illustrated in FIG. 1.

The electronic control unit 19 includes an electric inlet connection 35 serving to introduce a control signal. For example, such a control signal may be produced by an electric switch being arranged in the driver's cabin of the motor vehicle, and the signal is then transmitted to the electronic control unit 19. It is to be understood that the electronic control unit 19 processes this control signal and respectively controls the solenoid valves 33 and 34. Instead of the one illustrated inlet connection 35, it is also possible to arrange a plurality of such inlet connections to transmit additional control signals of the electronic control unit 19. Such an additional control signal may be a signal being derived from the ignition of the motor vehicle. It is also possible to introduce into the electronic control system 19 control signals of a CAN bus connection or control signals of other elements of a compressed air brake system or of a vehicle control system. However, it is not only possible to introduce signals from outside into the electronic control unit 19. Signals from within the compressed air processing system may be derived, for example signals coming from the different pressure sensors 11 and 32. These signals may also be introduced into the electronic control unit 19, they are processed in the electronic control unit 19, and they are converted in control signals to be transmitted to the respective solenoid valves.

The functionality of the compressed air processing system may be summarized as follows:

Starting from the illustration according to FIG. 1, the motor vehicle is in the parking position. The parking brake connection 22 and thus the spring brake cylinder 24 are deaerated by the deaerating system 30 of the second switching valve 28 of the valve arrangement 26. Consequently, the parking brake is actuated. During ignition, a respective signal is transmitted to the electronic control unit 19 such that this signal and the signals coming from the pressure sensors 11 and 32 are processed. When the motor of the vehicle is started, the compressor 3 is actuated. The pressure control unit 15 is in the load phase such that the reservoir containers 14 of the respective circuits are filled with compressed air until the predetermined pressure has been reached and completed filling has been indicated to the electronic control unit 19. The pressure control unit 15 is switched into the idle phase by the solenoid valve 18. The two switching valves 27 and 28 are switched by the solenoid valves 33 and 34 such that the parking brake cylinder 24 is aerated and the parking brake is released. The switching valves 27 and 28 are switched due to an additional signal being transmitted to the electronic control unit 19 via the inlet connection 35 or another inlet connection. The signal corresponds to the wish of the driver to release the parking brake. Then, the vehicle may be driven.

During the drive, the auxiliary brake and/or the parking brake may be used as an auxiliary brake. By respective control of the solenoid valve 34 and the second switching valve 28, the pressure at the parking brake connection 22 may be continuously lowered which results in a respective braking effect. A signal representing the value of the pressure is transmitted to the electronic control unit 19 by the pressure sensor 32. This auxiliary braking effect may also be caused and used depending on other signals, for example when the pressure in the overall brake circuits increases or when there is a signal being transmitted to the inlet connection 35 of the electronic control unit 19 via a CAN bus. When the destination has been reached, the parking brake may be reactivated. For this purpose, the solenoid valves 33 and 34 deaerate (in case they have not been located in the deaeration position) such that the two control valves 27 and 28 of the valve arrangement 26 return into the starting position illustrated in FIG. 1 such that the spring unit is deaerated and the spring brake is actuated.

Figure 2:
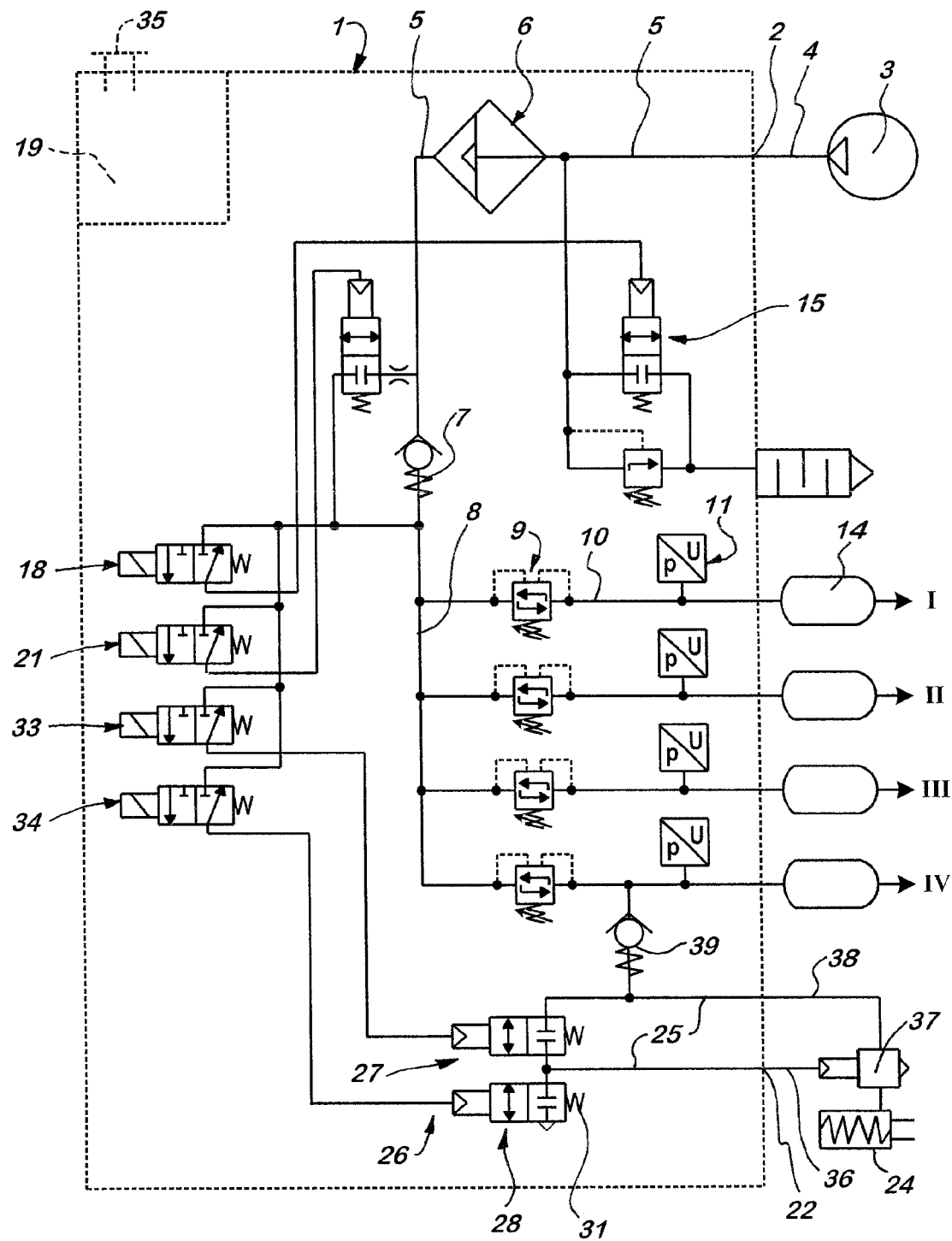
FIG. 2 is a view of a schematic connection diagram of a second exemplary embodiment of the novel compressed air processing system.

The embodiments of the novel compressed air processing system according to FIG. 2 have a lot in common with the embodiment illustrated in FIG. 1. Consequently, it is referred to the respective description hereinabove. In contrast, the conduit 25 is not connected to the central aerating system 8, but instead to a different circuit. In this case, the conduit 25 is connected to the circuit IV downstream of the pressure protection valve 9. The system does not include a pressure sensor 32. Instead of the direct conduit 23, a control conduit 36 is connected to the parking brake connection 22. The control conduit 26 leads to a relay valve 37. The relay valve 37 is supplied with compressed air via a conduit 38. The conduit 38 is connected to the conduit 25 upstream of the valve arrangement 26. A check valve 39 is arranged at the beginning of the conduit 25. The control valve 27 of the valve arrangement 26 is designed in the same way as it is illustrated in FIG. 1. The control valve 28 is changed in a way that the two switching positions are arranged in an inverted manner. The spring 31 acts upon the valve body of the switching valve 28 in the closed position. This arrangement has the advantage of the vehicle remaining ready to be driven and the parking brake not being actuated when electric supply fails when the vehicle is driven.

It is to be understood that not all differences between the embodiment of the system as illustrated in FIG. 1 and the embodiment of the system as illustrated in FIG. 2 have to be realized at the same time. Each of the above described changed features may be combined with the unchanged features as illustrated in FIG. 1. All these combinations are disclosed herein. The same applies to the changes as they will be explained in the following with reference to FIGS. 3 to 7.

Figure 3:
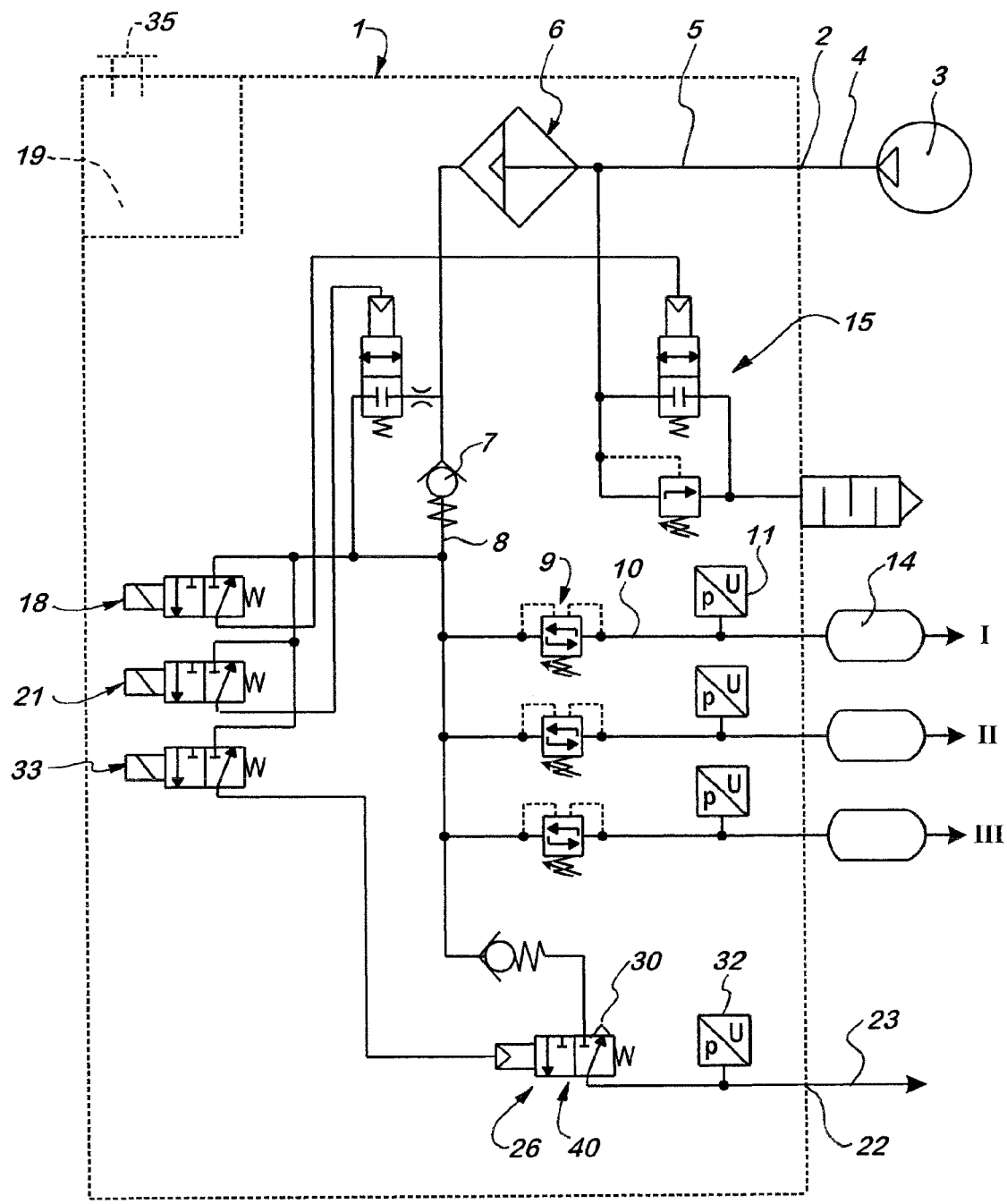
FIG. 3 is a view of a schematic connection diagram of a third exemplary embodiment of the novel compressed air processing system.

The embodiment of FIG. 3 also has some features in common with the above described embodiments of the system. The valve arrangement 26 is designed as a 3/2 ways valve 40 having an aerating position and a deaerating position for the parking brake connection 22. The 3/2 ways valve 40 includes its own deaerating system 30, and it is designed as to be clearly seen in FIG. 3. It is pre-controlled by one single solenoid valve 33. This embodiment of the compressed air compressing system does not include the circuit IV. In this way, it is emphasized that the number of pre-arranged circuits may be freely chosen. The functionality of this embodiment is understood by a person with skill in the art.

Figure 4:
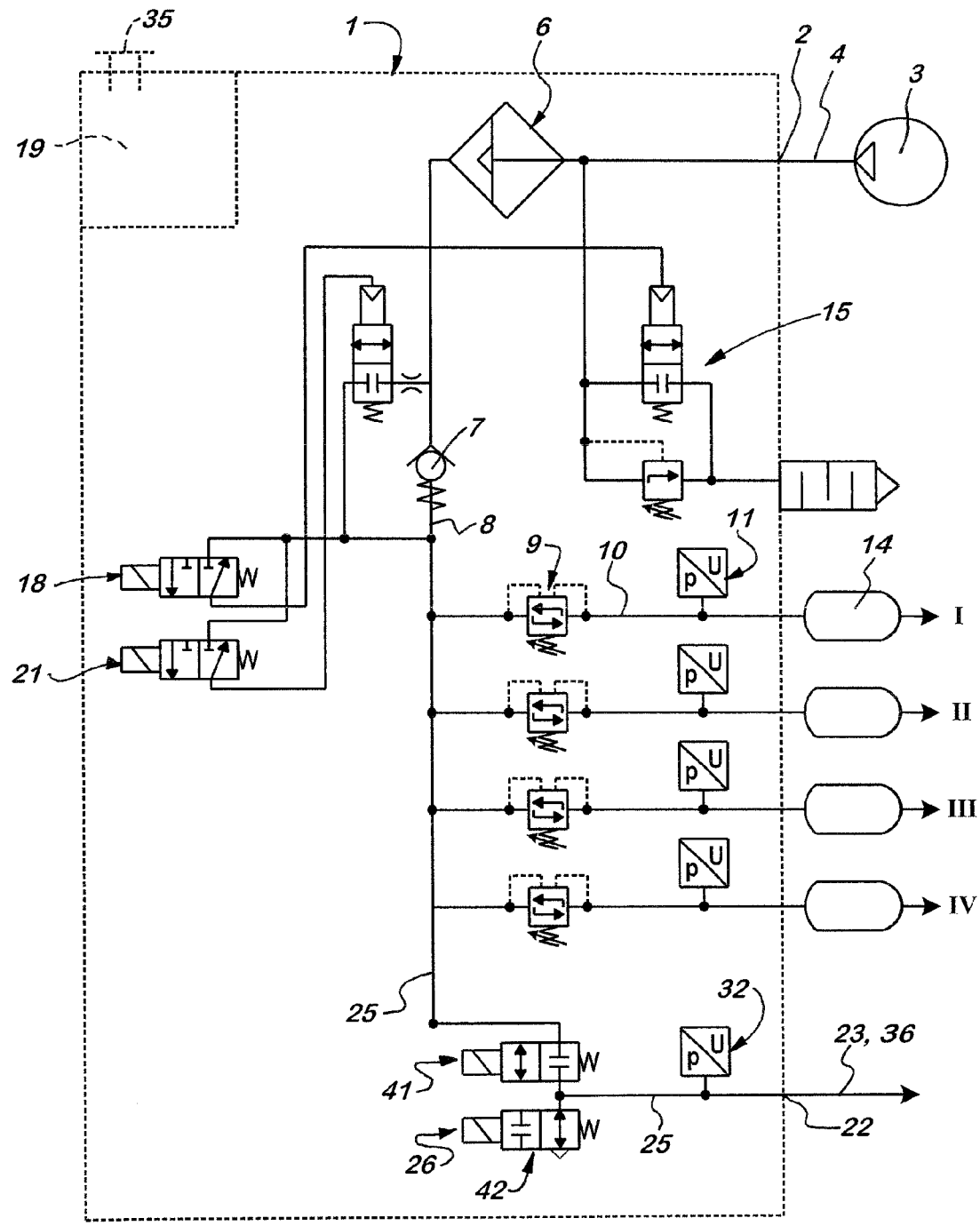
FIG. 4 is a view of a schematic connection diagram of a fourth exemplary embodiment of the novel compressed air processing system.

FIG. 4 illustrates two additional possibilities of designing the compressed air processing system. Instead of the pre-controlled valves, two directly controllable solenoid valves 41 and 42 are arranged. These solenoid valves 41 and 42 have the illustrated switching positions being associated with springs. The solenoid valves 33 and 34 as pre-control valves are not required. It is to be understood that the solenoid valves 41 and 42 are directly controlled by the electronic control unit 19. Furthermore, it is to be seen that one single solenoid valve which is directly controllable and which is designed as a 3/2 ways valve may replace the two directly controllable solenoid valves 41 and 42. The conduit 25 leading to the parking brake connection 22 is connected to the central aerating system 8. However, it may also be connected to another circuit downstream of the pressure protection valve 9 of this circuit. A direct conduit 23 or a control conduit 36 may be connected to the parking brake connection 22.

Figure 5:
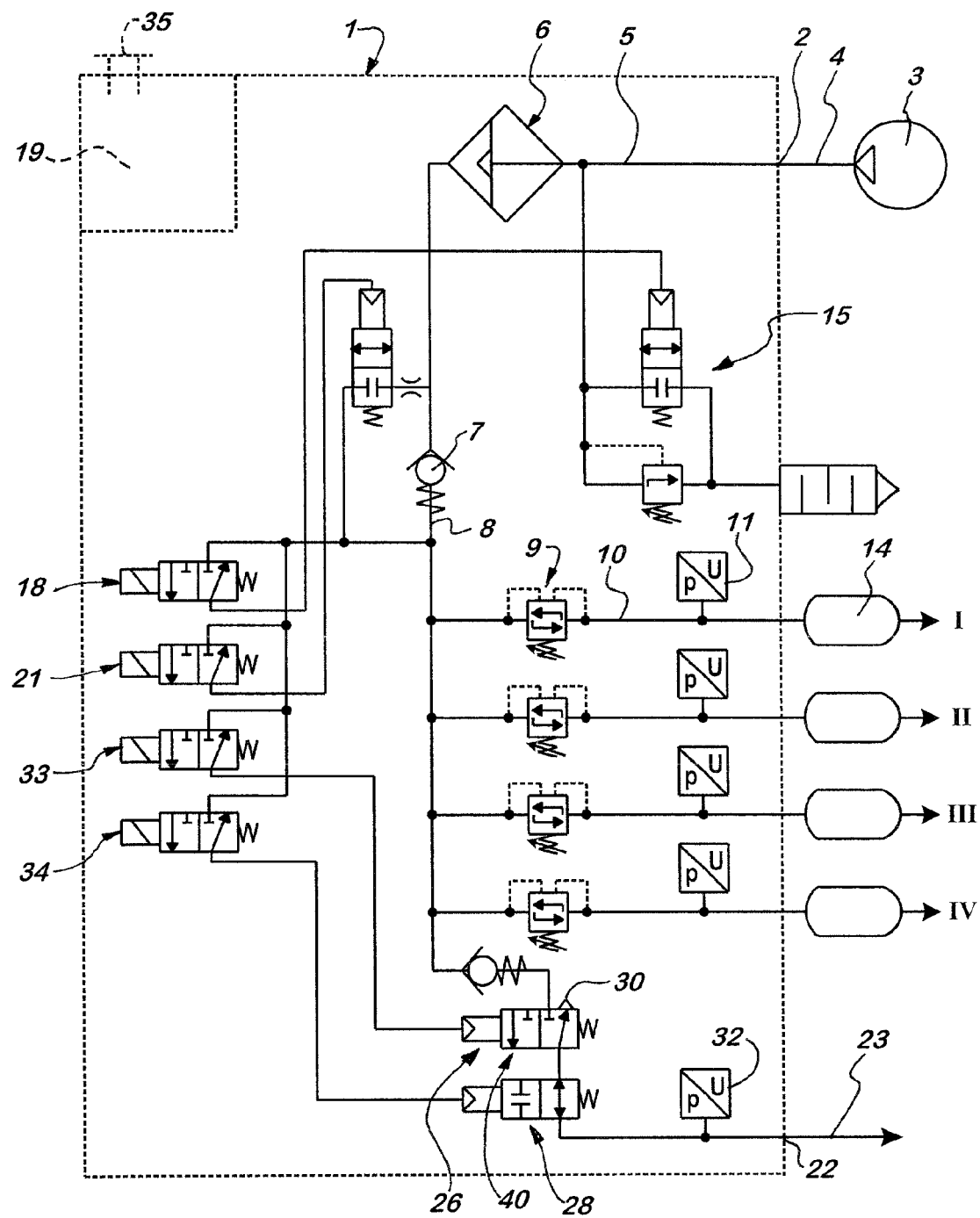
FIG. 5 is a view of a schematic connection diagram of a fifth exemplary embodiment of the novel compressed air processing system.

The exemplary embodiment of the novel system according to FIG. 5 is similar according to the one according to FIG. 3. The valve arrangement 26 includes a 3/2 ways valve 40 and a switching valve 28 being located in series within the conduit 25. The 3/2 ways valve 40 is pre-controlled by the solenoid valve 33. The switching valve 28 is pre-controlled by the solenoid valve 34. In this way, pre-control corresponds to the embodiments of FIGS. 1 and 2.

The valve 40 serves for aeration and deaeration. The switching valve 28 has a locking position and a passage position.

Figure 6:
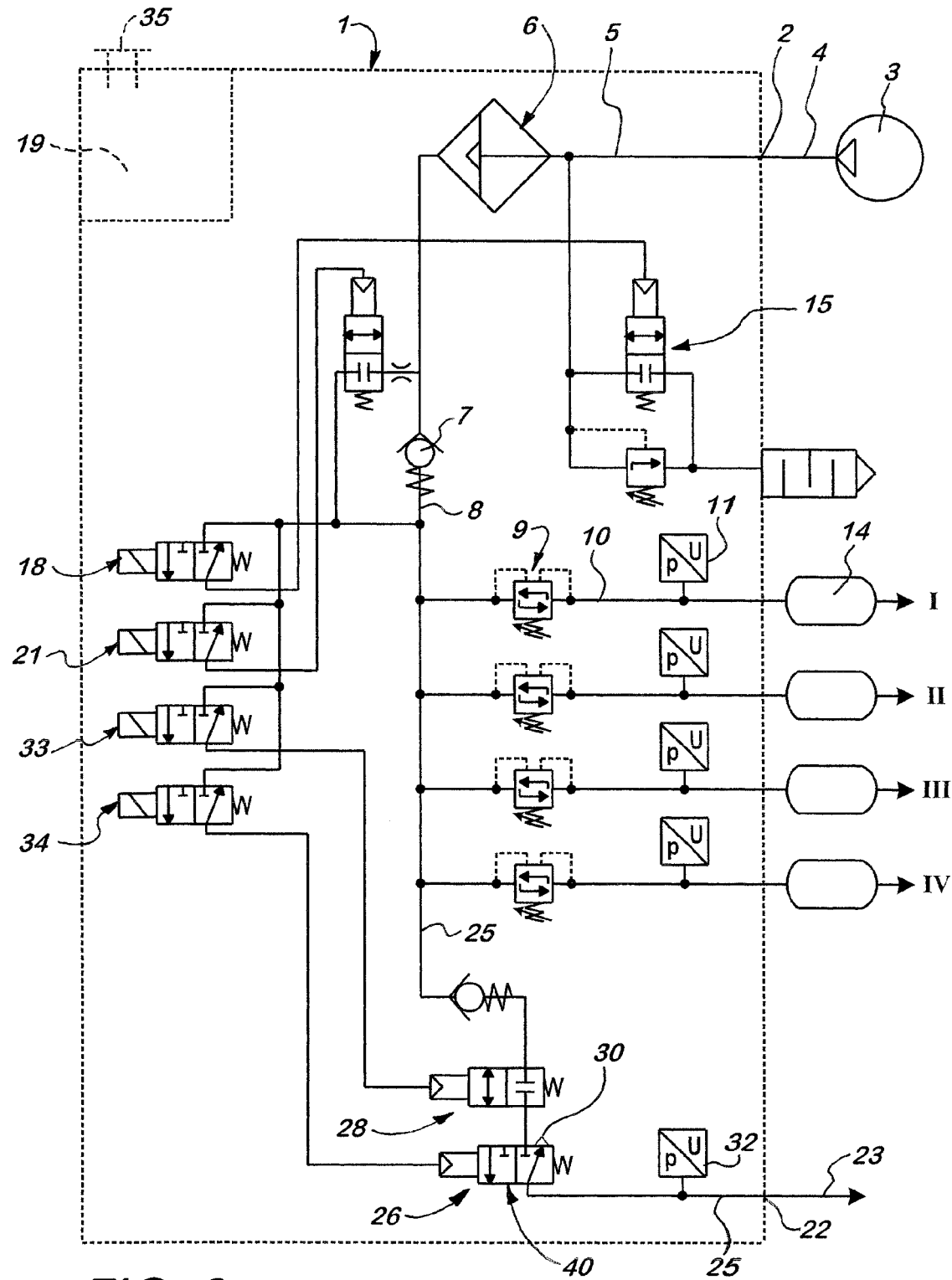
FIG. 6 is a view of a schematic connection diagram of a sixth exemplary embodiment of the novel compressed air processing system.

The embodiment of the novel system according to FIG. 6 is similar to the one according to FIG. 5. The switching valve 28 and the 3/2 ways valve 40 are arranged in an inverted way in the conduit 25 and within the valve arrangement 26. The switching valve 28 has a locking position and a passage position. The 3/2 ways valve 40 has its own deaerating system 30, and it serves to aerate and deaerate and in connection with the switching valve 28 to realize a locking position.

Figure 7:
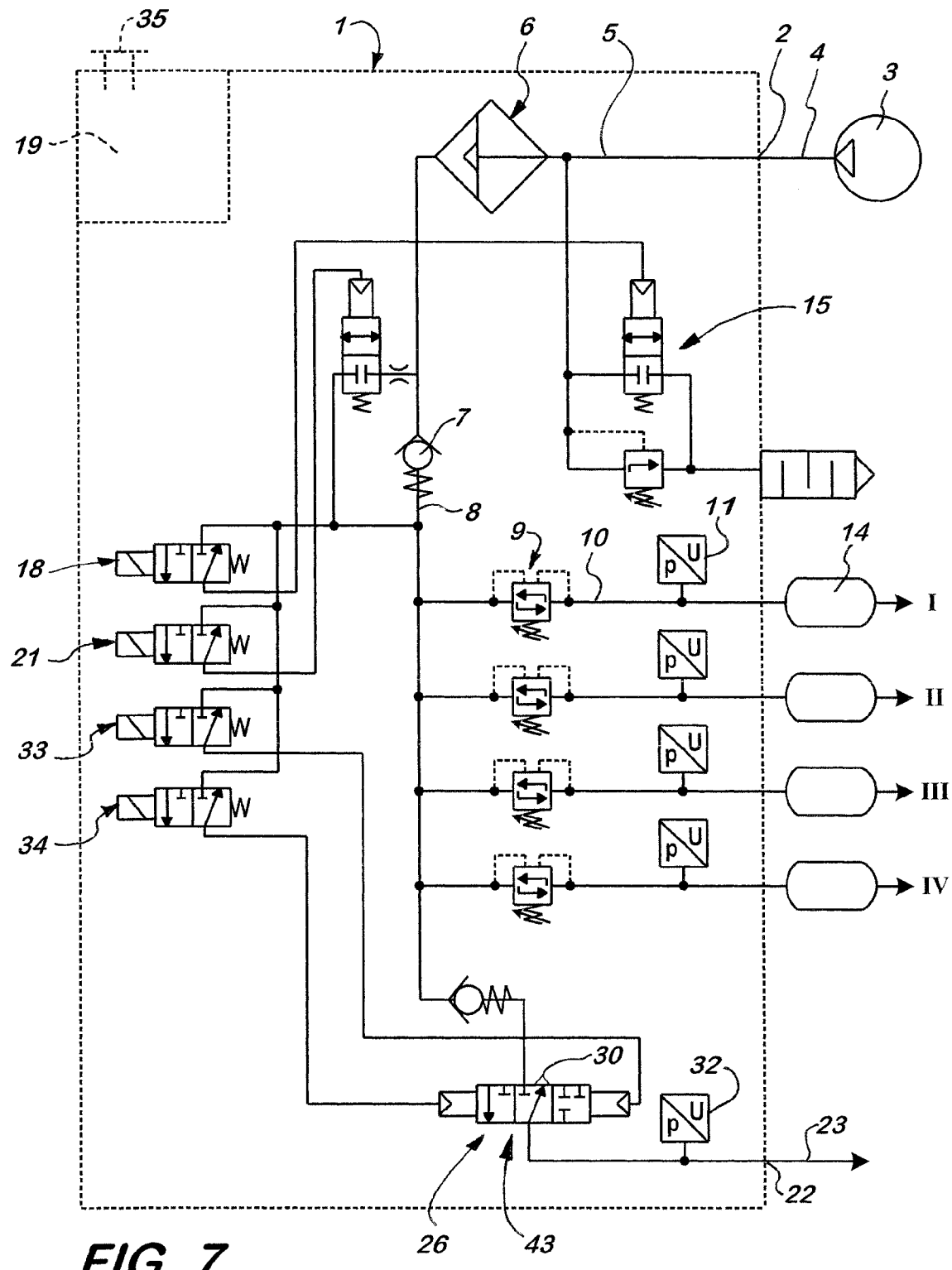
FIG. 7 is a view of a schematic connection diagram of a seventh exemplary embodiment of the novel compressed air processing system.

In the exemplary embodiment of the novel system according to FIG. 7, there is a 3/3 ways valve 43 which forms the valve arrangement 26 and which has its own deaerating connection. The 3/3 ways valve 43 is pre-controlled by the solenoid valves 33 and 34. It has an aerating position, a deaerating position and a locking position.

Many variations and modifications may be made to the preferred embodiments of the invention without departing substantially from the spirit and principles of the invention. All such modifications and variations are intended to be included herein within the scope of the present invention, as defined by the following claims.

What is claimed is:

1. A compressed air processing system, comprising:
    an inlet connection; said inlet connection being designed and arranged to be connected to a conduit being connected to a compressor;
    a pressure control unit;
    a multi-circuit protection valve;
    a plurality of outlet connections, each of said outlet connections being designed and arranged to be connected to a circuit;
    a parking brake connection, said parking brake connection being designed and arranged to be connected to a conduit being connected to a parking brake cylinder;
    an electronic control unit, said electronic control unit including an electric input connection for a control signal; and
    a valve arrangement, said valve arrangement being designed and arranged to aerate and lock said parking brake connection in a controlled way due to a signal being generated by said electronic control unit, and
    said valve arrangement being designed and arranged to deaerate said parking brake connection due to a signal being generated by said electronic control unit.

2. The compressed air processing system of claim 1, wherein said valve arrangement includes a first switching valve and a second switching valve, said first switching valve and said second switching valves being designed and arranged to be separately controllable, said first switching valve having a passage position and a locking position and said second switching valve having a locking position and a deaerating position.

3. The compressed air processing system of claim 1, wherein said valve arrangement includes a 3/2 ways valve, said 3/2 ways valve having its own deaerating system.

4. The compressed air processing system of claim 1, further comprising a pressure sensor, said pressure sensor being arranged between said valve arrangement and said parking brake connection, said pressure sensor being designed and arranged to produce a signal to be transmitted to said electronic control unit.

5. The compressed air processing system of claim 1, further comprising a central aerating system for all circuits and a conduit leading to said parking brake connection, said valve arrangement being located in said conduit leading to said parking brake connection, said valve arrangement being connected to said central aerating system in a way to bypass overflow valves of other circuits.

6. The compressed air processing system of claim 1, further comprising a central aerating system for all circuits and a conduit leading to said parking brake connection, said valve arrangement being arranged in said conduit, said conduit being connected to said central aerating system downstream of a pressure protection valve of a different circuit.

7. The compressed air processing system of claim 1, wherein said valve arrangement includes at least one switching valve being designed and arranged to be pre-controlled by at least one solenoid valve.

8. The compressed air processing system of claim 1, wherein said valve arrangement includes at least one directly controlled solenoid valve.

9. The compressed air processing system of claim 1, wherein said valve arrangement includes two separately controllable switching valves, said switching valves being arranged in series with respect to a conduit leading to said parking brake connection.

10. The compressed air processing system of claim 1, further comprising a mechanical spring, said mechanical spring being designed and arranged to determine a position in which said parking brake connection is deaerated.

11. A compressed air processing system, comprising:
a plurality of circuits;
a compressor;
a first conduit, said first conduit being connected to said compressor;
an inlet connection; said inlet connection being designed and arranged to be connected to said first conduit;
a pressure control unit;
a plurality of outlet connections, each of said outlet connections being designed and arranged to be connected to one of said circuits;
a parking brake cylinder;
a second conduit, said second conduit being designed and arranged to be connected to said parking brake cylinder;
a parking brake connection, said parking brake connection being designed and arranged to be connected to said second conduit;
an electronic control unit, said electronic control unit including an electric input connection for a control signal; and
a valve arrangement,
said valve arrangement being designed and arranged to aerate and lock said parking brake connection in a controlled way due to a signal being generated by said electronic control unit, and
said valve arrangement being designed and arranged to deaerate said parking brake connection due to a signal being generated by said electronic control unit.

12. The compressed air processing system of claim 11, wherein said valve arrangement includes a first switching valve and a second switching valve, said first switching valve and said second switching valves being designed and arranged to be separately controllable, said first switching valve having a passage position and a locking position and said second switching valve having a locking position and a deaerating position.

13. The compressed air processing system of claim 11, wherein said valve arrangement includes a 3/2 ways valve, said 3/2 ways valve having its own deaerating system.

14. The compressed air processing system of claim 11, further comprising a pressure sensor, said pressure sensor being arranged between said valve arrangement and said parking brake connection, said pressure sensor being designed and arranged to produce a signal to be transmitted to said electronic control unit.

15. The compressed air processing system of claim 11, further comprising a central aerating system for all circuits and a conduit leading to said parking brake connection, said valve arrangement being located in said conduit leading to said parking brake connection, said valve arrangement being connected to said central aerating system in a way to bypass overflow valves of other circuits.

16. The compressed air processing system of claim 11, further comprising a central aerating system for all circuits and a conduit leading to said parking brake connection, said valve arrangement being arranged in said conduit, said conduit being connected to said central aerating system downstream of a pressure protection valve of a different circuit.

17. The compressed air processing system of claim 11, wherein said valve arrangement includes at least one switching valve being designed and arranged to be pre-controlled by at least one solenoid valve.

18. The compressed air processing system of claim 11, wherein said valve arrangement includes at least one directly controlled solenoid valve.

19. The compressed air processing system of claim 11, wherein said valve arrangement includes two separately controllable switching valves, said switching valves being arranged in series with respect to a conduit leading to said parking brake connection.

20. The compressed air processing system of claim 11, further comprising a mechanical spring, said mechanical spring being designed and arranged to determine a position in which said parking brake connection is deaerated.

* * * * *